(12) United States Patent
Pflueger

(10) Patent No.: US 6,833,651 B2
(45) Date of Patent: Dec. 21, 2004

(54) CLAW-POLE ROTOR AND PRODUCTION METHOD THEREFOR

(75) Inventor: Gerhard Pflueger, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/450,623

(22) PCT Filed: Oct. 23, 2002

(86) PCT No.: PCT/DE02/03992

§ 371 (c)(1),
(2), (4) Date: Jun. 16, 2003

(87) PCT Pub. No.: WO03/041242

PCT Pub. Date: May 15, 2003

(65) Prior Publication Data

US 2004/0036376 A1 Feb. 26, 2004

(30) Foreign Application Priority Data

Nov. 9, 2001 (DE) ......................................... 101 55 223

(51) Int. Cl.⁷ ............................................... H02K 1/22
(52) U.S. Cl. ..................................................... 310/263
(58) Field of Search ............................... 310/263, 181, 310/156.66–156.73; 29/598

(56) References Cited

U.S. PATENT DOCUMENTS

| 5,828,155 A | * | 10/1998 | Adachi et al. | ............... 310/263 |
| 6,013,968 A | * | 1/2000 | Lechner et al. | ............. 310/263 |
| 6,548,935 B1 | * | 4/2003 | Shendi et al. | ............... 310/263 |

FOREIGN PATENT DOCUMENTS

| DE | 199 51 115 A1 | 5/2000 |
| DE | 199 39 804 A1 | 2/2001 |
| DE | 199 39 808 A | 2/2001 |
| DE | 199 51 115 A | 5/2001 |

* cited by examiner

*Primary Examiner*—Dang Le
(74) *Attorney, Agent, or Firm*—Michael J. Striker

(57) ABSTRACT

An alternator for motor vehicles has a stator and a claw-pole rotor that co-operates with the latter. The claw-poles of the rotor have claw-pole fingers which are uniformly distributed around the periphery, axially intermesh in alternate directions at a distance from one another and have a pole core and an excitation winding. Permanent magnets are arranged between the claw-pole fingers and are held in a retaining ring with a zigzag configuration. To mount the retaining ring in as simple a manner as possible between the claw-pole fingers, a longitudinal slit is provided on each longitudinal side of the claw-pole finger. The retaining ring engaged in said slit by one respective longitudinal side or its axial section.

14 Claims, 7 Drawing Sheets

Fig. 3
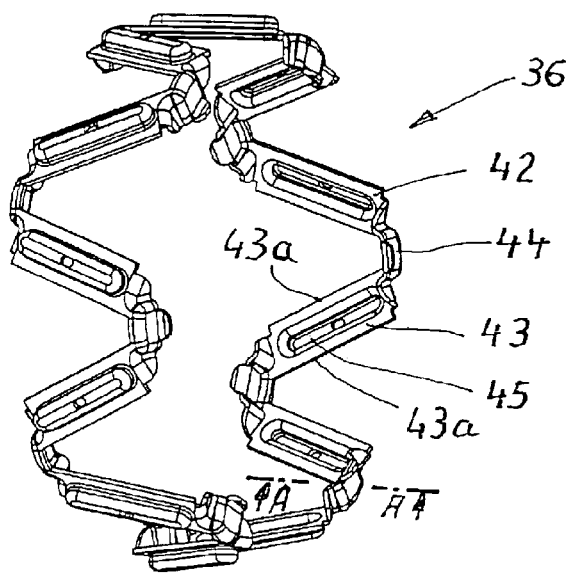
(3a)
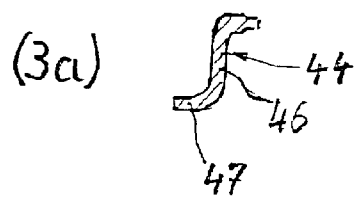
Fig. 4
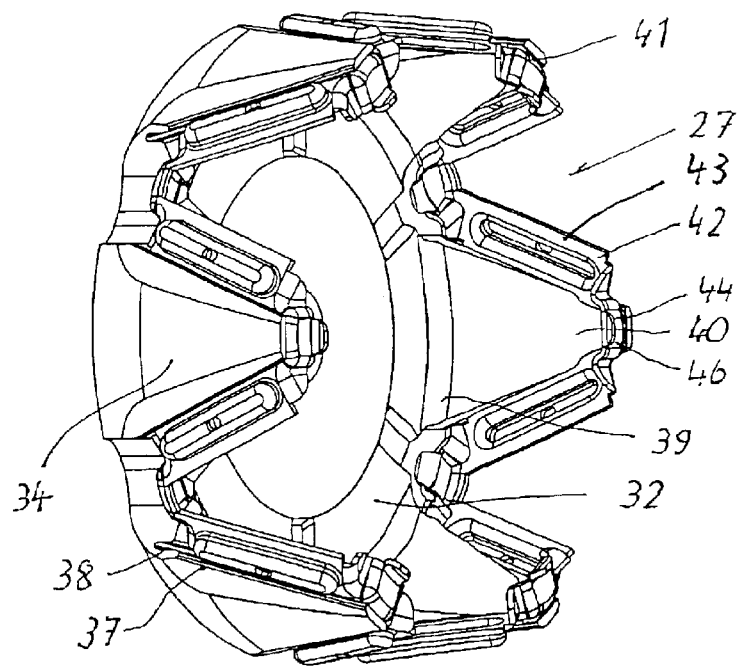

CLAW-POLE ROTOR AND PRODUCTION METHOD THEREFOR

BACKGROUND OF THE INVENTION

The invention relates to an electric machine, in particular a three-phase generator for motor vehicles and a method for producing a machine of this nature.

An electric machine of this nature is made known in DE 199 39 808 A1. According to said publication, the permanent magnets in the open spaces between the intermeshing claw-pole fingers are inserted into a retaining ring that absorbs the centrifugal forces acting on the permanent magnets produced when the machine operates. The retaining ring is welded together with the adjacent claw-pole fingers on both sides of its axial sections.

Using a "windingless rotor" as an example, a means of attaining the object of the invention described hereinabove has the advantage that welding the retaining ring results in a permanent connection being formed between the free claw pole conductive element and the claw pole plate situated on the rotor shaft, allowing the connection ring used heretofore to be eliminated. Since, in the case of "slip-ring rotors", both claw poles are usually mounted on the rotor shaft, a fixed connection is not required there.

Rather, it has the disadvantage that a special working step performed at an additional processing station is required to make the welded connections between the retaining ring and claw-pole fingers.

The goal of the present means of attaining the object of the invention is to permit the simplest possible installation of the retaining ring between the claw-pole fingers.

SUMMARY OF THE INVENTION

Compared to the prior art, the electric machine according to the invention having the characterizing features of claim 1 has the advantage that the reconfiguration of the claw-pole fingers enables the creation of nothing more than a positive connection between the permanent magnets and the retaining ring, instead of a fixed connection. As such, the costly need to produce welded connections is eliminated, and the centrifugal forces acting on the retaining ring are still reliably absorbed by the claw poles.

A further advantage is the fact that, due to the zigzag configuration of the retaining ring, the holders for the permanent magnets no longer extend into the winding space for the excitation winding, which means that an excitation winding having a larger cross-section and, therefore, greater excitation power can now be housed in the claw-pole rotor.

Compared to the prior art, the method according to the invention for producing an electric machine according to the characterizing features of claim 6 has the advantage that the retaining ring and permanent magnets can be installed fully automatically between the claw poles of the rotor on the existing assembly line for producing a claw-pole rotor without permanent magnets at an additional assembly station inserted there.

As an additional means for restricting the elastic pressing-upward of the claw-pole fingers by the centrifugal forces within narrow limits, the longitudinal slits on the lateral flanks of the claw-pole fingers are interconnected via an end-face slit on the tip of the claw-pole fingers, into which said end-face slit a bead integrally molded on the connection section of the retaining ring engages. Furthermore, to increase the bending stiffness of the axial sections of the retaining ring, it is advantageous to equip each of them with a radially outwardly directed longitudinal hollow. Simple production of the retaining ring can be attained by punching and stamping the retaining ring out of a piece of non-magnetic sheet metal. In the simplest manner possible, a punched-out sheet metal strip is used that is bent and stamped in the shape of an open retaining ring.

Although the inventive features can be used particularly advantageously with collector rings, they can also be realized on "windingless rotors", provided that the fixed claw-pole connection is created there using additional means or measures. In that case, the conductive element forms one of the two claw poles.

BRIEF DESCRIPTION OF THE DRAWINGS

In the production of the electric machine according to the invention, axial longitudinal slits for accommodating the axial sections of the retaining ring are recessed in the lateral flanks of the claw-pole fingers in a process step in preparation for assembly of the retaining ring. At an additional assembly station, the retaining ring with a zigzag configuration is first inserted into the longitudinal slits in the claw-pole fingers of the first claw pole by means of one longitudinal side of its axial sections. To accomplish this, the first claw pole is mounted on a tool holder that has a magnetic ring enclosing the claw-pole fingers and the retaining ring from the outside, which said magnetic ring is partially magnetized in the region of the axial sections of the retaining ring. To install the permanent magnets, they are advantageously first inserted in an annular arrangement in axial holes of a round magazine. The round magazine is then positioned over the exposed, end-face connection section of the retaining ring in such a manner that the axial holes with the permanent magnets come to rest in pairs between the connection sections of the retaining ring. Using an annular plunger having fingers matched with the holes in the round magazine that is located above the round magazine, the permanent magnets are pushed axially out of the holes into the space between the claw-pole fingers until the permanent magnets rest against each of the lateral flanks of a claw-pole finger. As they are pushed further, the permanent magnets glide along the side of the lateral flanks of the claw-pole fingers, thereby assuming an inclined position, where they are held by the magnetic ring by means of its partial magnetization. After the plunger and the round magazine are removed, the permanent magnets are set into their final position on the axial sections of the retaining ring by means of a shaped plunger having a claw pole-shaped contour plunging axially into the magnetic ring of the tool holder, where they are held by the magnetic ring. The first subassembly which is preassembled in this fashion is joined, together with the tool holder and the magnetic ring, with the rotor shaft, the pole core, the excitation winding, and the second claw-pole, and the first claw-pole is placed on the rotor shaft with an interference fit. The second claw-pole is placed on the rotor shaft with a sliding fit, then positioned by the first claw-pole and the retaining ring, and, finally, caulked with the rotor shaft.

SUMMARY OF THE DRAWINGS

Figure 1:
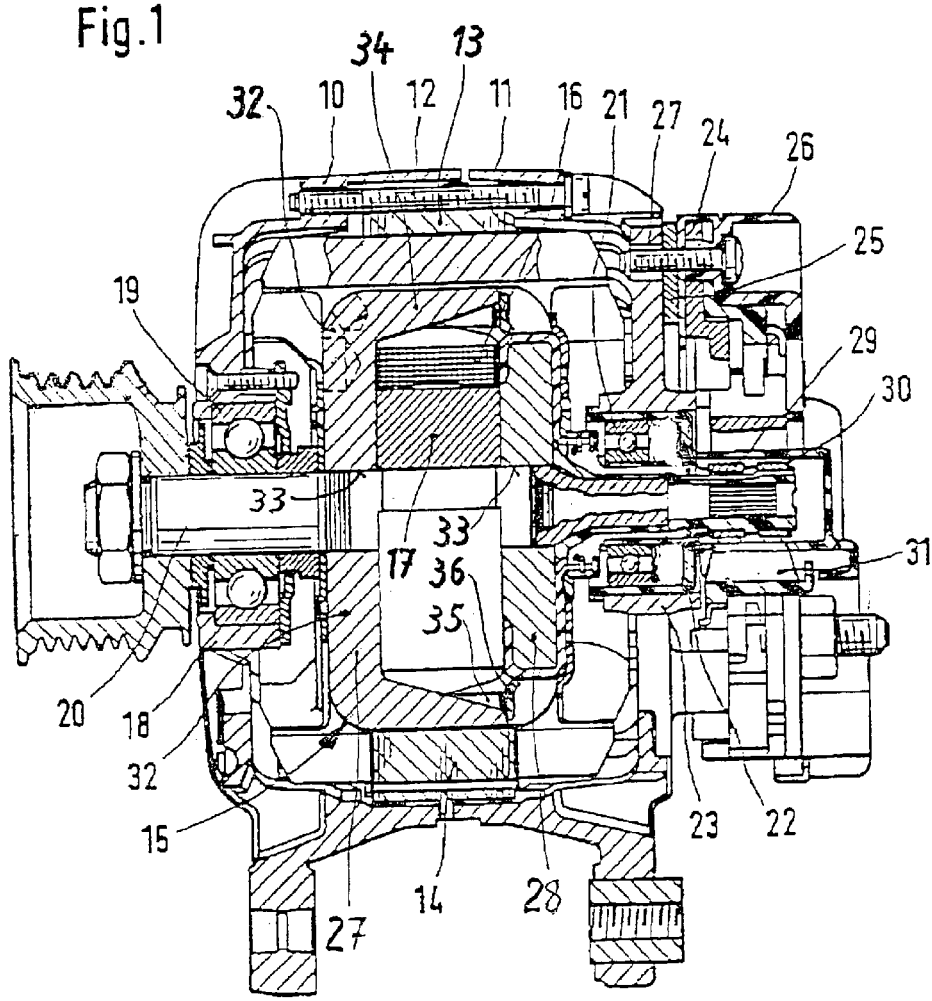

An exemplary embodiment of the invention is presented in the drawings and described in greater detail.

Figure 2:
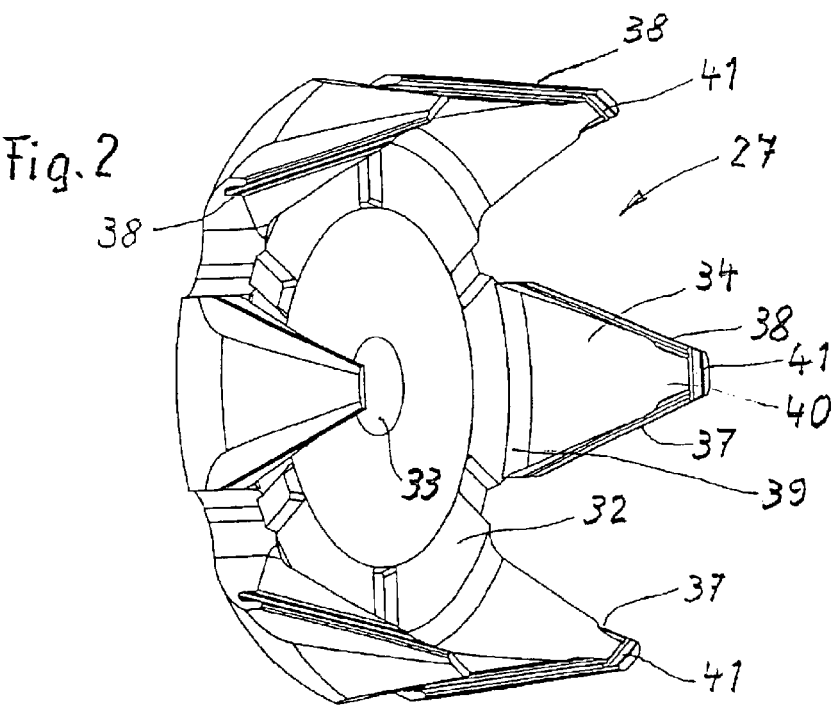
Figure 5:
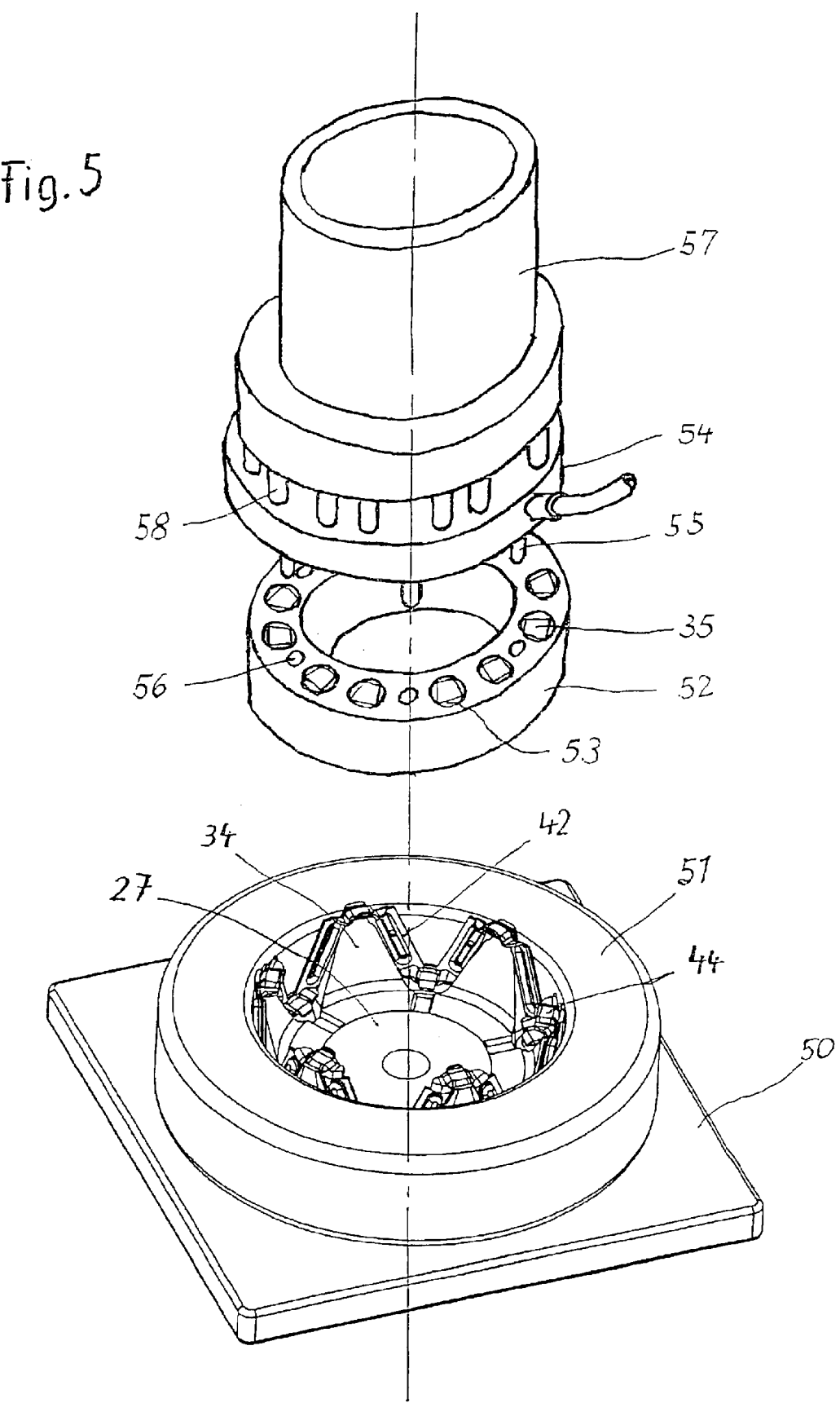
Figure 6:
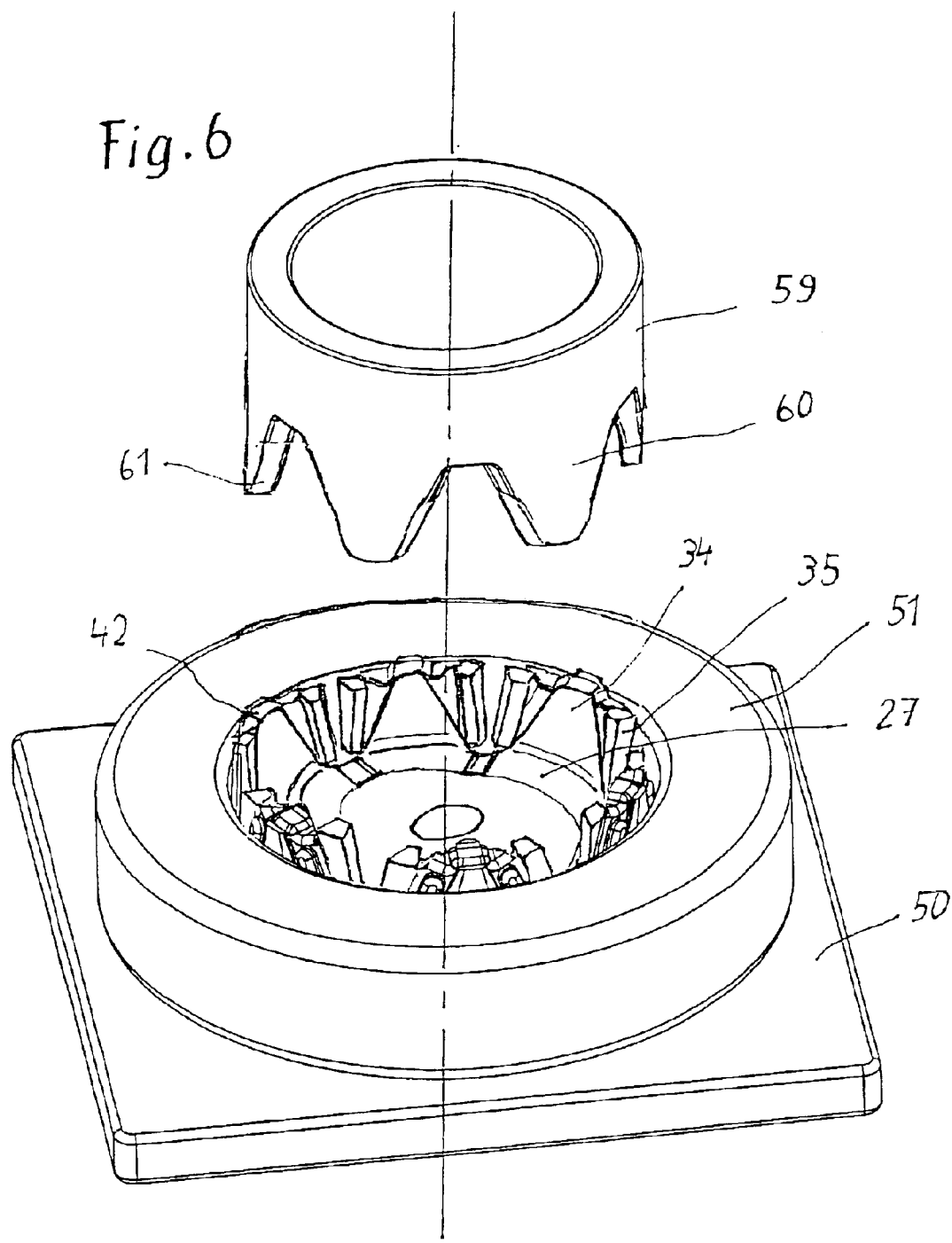
Figure 7:
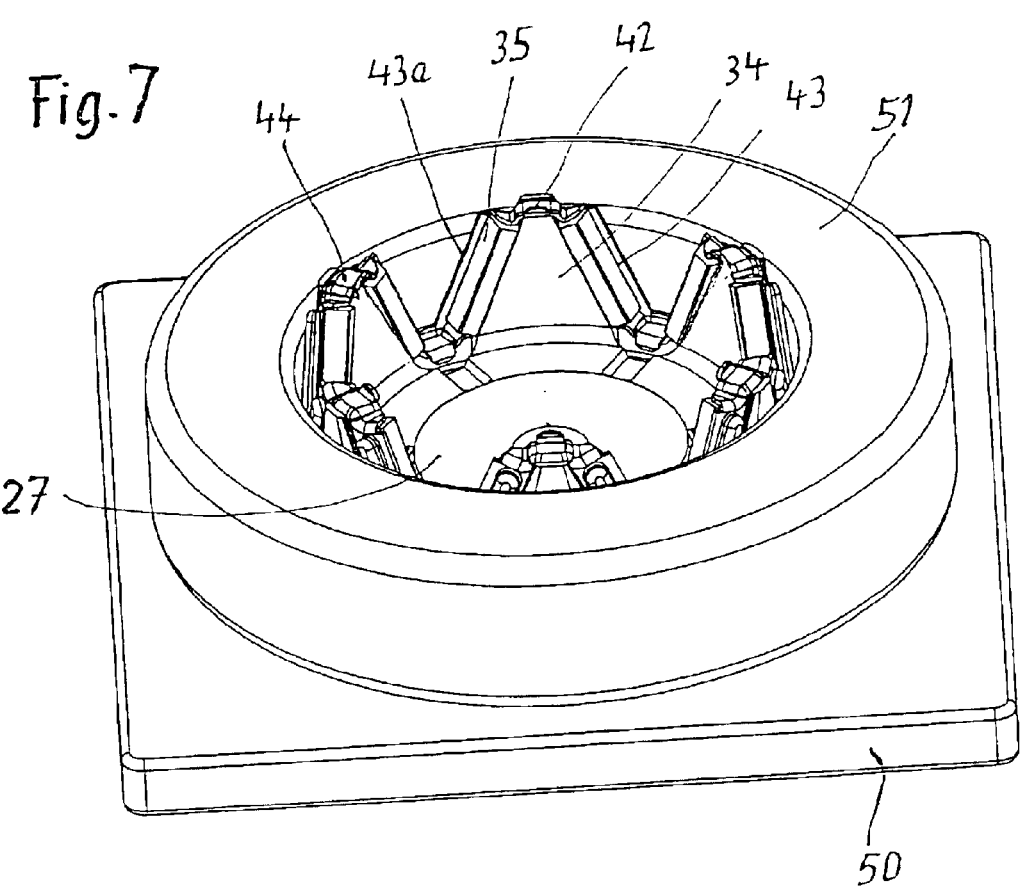
Figure 8:
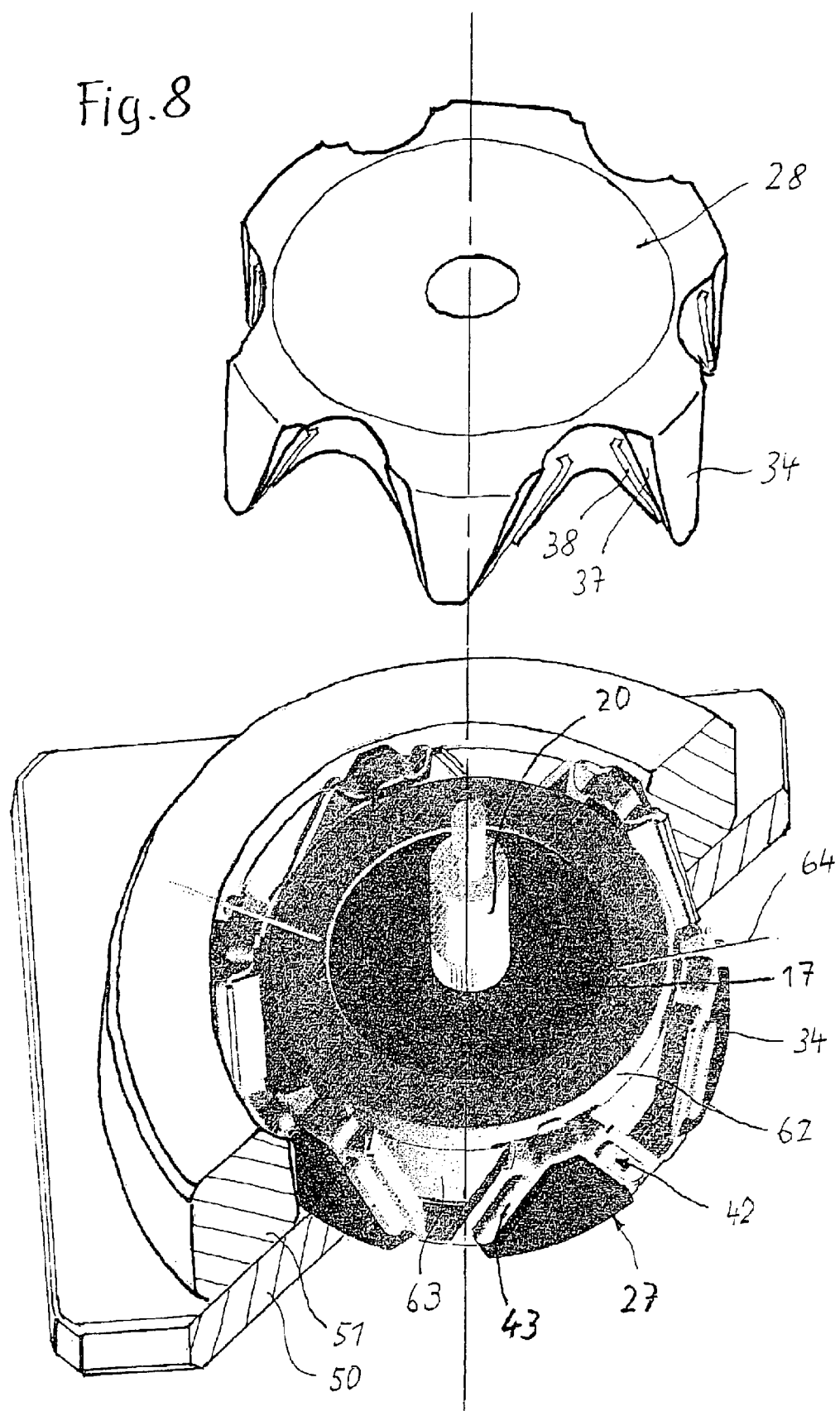
Figure 9:
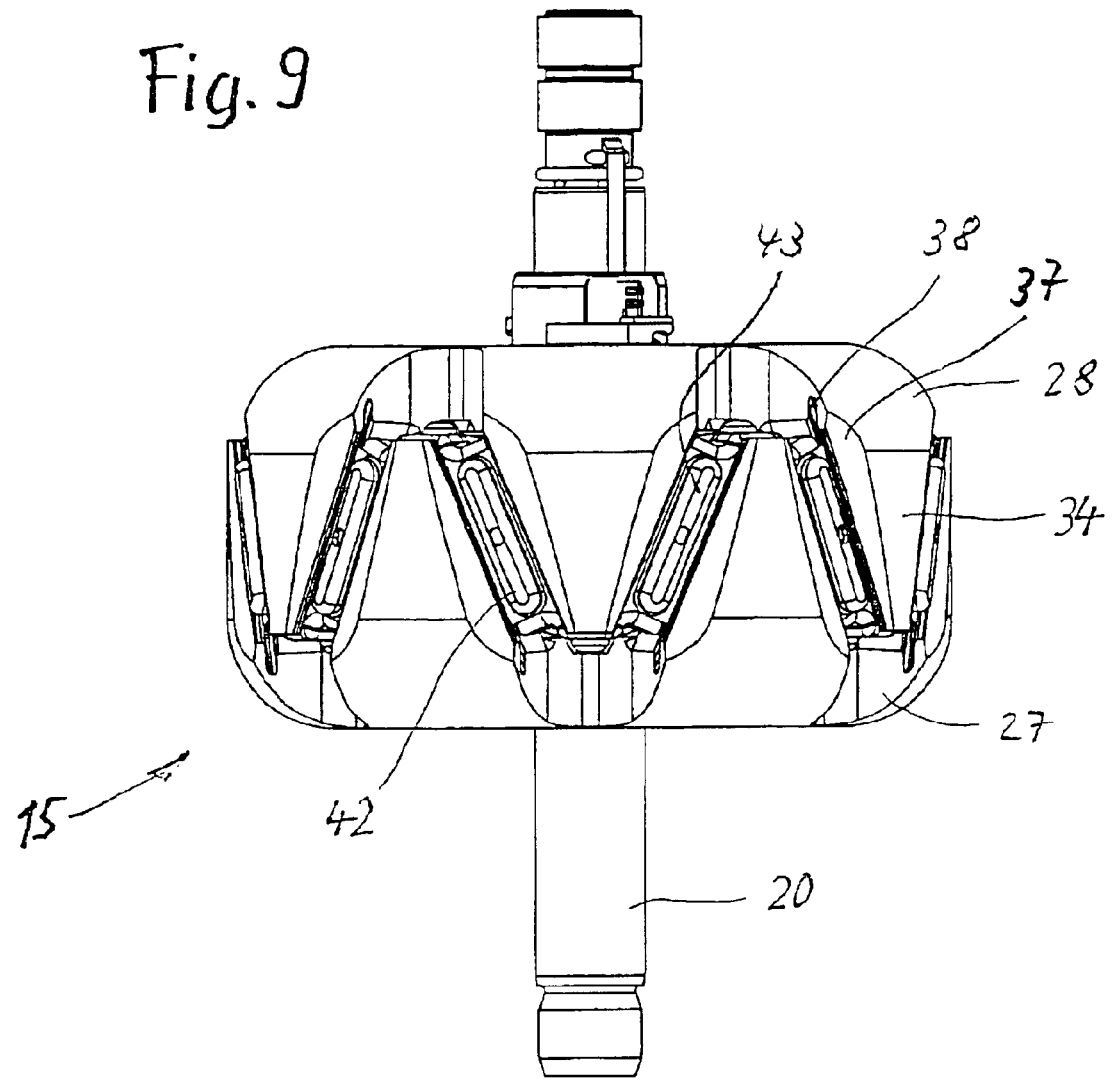

FIG. 1 is a longitudinal sectional view of a three-phase generator for motor vehicles configured according to the invention, FIG. 2 is a spacial representation of a first claw-pole of the alternator in FIG. 1, FIG. 3 is a spacial representation of a retaining ring for the permanent magnets, FIG. 4 is a spacial representation of the first claw pole with installed retaining ring, FIG. 5 is a spacial representation of an assembly station for inserting the permanent magnets, FIG. 6 shows the assembly station in FIG. 5 with a shaped plunger for positioning the permanent magnets, FIG. 7 shows the assembly station in FIG. 6 with the first claw pole, the retaining ring, and the permanent magnets positioned therein as the first subassembly, FIG. 8 is a partial view of the assembly station in FIG. 7 with the second subassembly comprising rotor shaft, pole ring and excitation winding inserted in the first claw pole, and with the second claw pole before assembly, and FIG. 9 shows the assembled claw-pole rotor.

DESCRIPTION OF THE PREFERRED EMBODIMENTS

FIG. 1 is a longitudinal sectional view of a three-phase generator for motor vehicles, the housing of which is composed substantially of two end shields 10 and 11 that are held together by screws 12, and between which the laminated stack 13 of a stator 14 is clamped. A claw-pole rotor 15 is located inside the stator bore, the excitation winding 16 of which is wound on a pole core 17. A hub 18 is developed on the left drive side of the generator in the end shield 10, in which said hub a roller bearing 19 is located to support the drive-end part of a rotor shaft 20. The right part of the rotor shaft 20 is supported in a roller bearing 21 having a weaker configuration, which said roller bearing is located together with a collector-ring housing 22 in a hub 23 of the end shield 11. A positive heat sink 24 and a negative heat sink 25 of a rectifier, together with a protective cap 26, are mounted on the front side of the rear end shield 11. A first and second claw pole 27, 28 are pressed onto or caulked on the rotor shaft 20 on the front side of the pole core 17. Two collector rings 29, 30 are secured in an insulated manner to the rear shaft end to supply electricity to the excitation winding 16. Said collector rings interact with the brushes of a brush holder 31 secured on the rear end shield 11.

The claw poles 27 and 28 are produced out of pole plates by means of cold forming. Each of them is composed of a pole disk 32 with a hole 33 stamped in the center, and axially angled claw-pole fingers 34 distributed evenly around the circumference. The claw-pole fingers 34 of the two claw poles 27 and 28 intermesh in alternate directions at a distance from one another, and they enclose the excitation winding 16. To increase the excitation power of the claw-pole rotor 15, a permanent magnet 35 is located between each of the claw-pole fingers 34 and housed in a holder 36 in such a manner that is is supported against the centrifugal forces acting on it when the machine operates.

FIG. 2 shows an enlarged spacial representation of the first claw pole 27 of the claw-pole rotor 15. Said figure shows that each of the claw-pole fingers 34 has a longitudinal slit 38 created by means of chip removal on its lateral flank 37, which said longitudinal slit extends from the claw-pole base 39 to the claw-pole tip 40 in freely emerging fashion. The longitudinal slits 38 on the two lateral flanks 37 of each claw-pole finger 34 are interconnected on the claw-pole tip 40 of the claw-pole fingers 34 by means of an end-face slit 41.

FIG. 3 shows the holder 36 for the permanent magnets 35 in the form of a zigzag-configured retaining ring 42 produced out of non-magnetic material that comprises alternating axial sections 43 and connection sections 44, which said connection sections simultaneously function as axial stops for the permanent magnets 35. The retaining ring 42 has been punched, bent and stamped out of a piece of sheet metal. As an alternative, it can also be punched, bent and stamped as an open retaining ring out of a sheet metal strip, whereby the beginning and end of the sheet metal strip are preferably located in the center of an axial section 43. Each of the axial sections 43 of the retaining ring 42 is equipped with a radially outwardly arched longitudinal hollow 45 to increase its bending stiffness. The connection sections 44 are configured—as shown in FIG. 3a—as bars 46 with a sheet metal cross-section that is rectangular, radially bent-upward, and frame-shaped, as shown along the line A—A in FIG. 3. This provides the connection sections 44 with a high amount of bending stiffness against the centrifugal forces that occur there. It is greater than the bending stiffness of the axial sections 43 in terms of the centrifugal forces that occur there.

FIG. 4 shows an enlarged spacial representation of the first claw-pole 27 in FIG. 2 with the retaining ring 42 in FIG. 3 pushed onto its claw-pole fingers 34. Said FIG. 4 shows that each of the axial sections 43 rests against a lateral flank 37 of the claw-pole fingers 34 by means of its one longitudinal side by engaging in the longitudinal slit 38 of the claw-pole fingers 34 recessed there, and the connection sections 44 of the retaining ring 42 connect two adjacent axial sections 43 with each other on each of the pole tips 40 of the claw-pole fingers 34. Combined with FIG. 3, it is furthermore obvious in FIG. 4 that the bars 46 of the connection sections 44 are molded on over nearly their entire width and angled radially inwardly on each of the end faces of the adjacent axial sections 43. This provides the retaining ring 42 with a high amount of stiffness against the centrifugal forces that act on it. Furthermore, the connection sections 44 form an axial stop when the retaining ring 42 is pushed onto the claw-pole fingers 34 of the claw pole 27. In this position, furthermore, a bead 47 integrally molded on the connection sections 44 of the retaining ring 42 engages in the slit 41 on the pole tip 40 of the claw-pole fingers 34.

Existing production lines can be used to produce the three-phase generator according to FIG. 1. Due to the novel method of holding the permanent magnets in the claw-pole rotor 15 according to the invention, the production of the stator 14 and the two end shields 10 and 11 remains unchanged. With regard for the claw-pole rotor 15 as well, its individual parts, e.g., rotor shaft 20, pole core 17, excitation winding 16, claw poles 27 and 28, and the complete collector ring arrangement can be produced first in unchanged fashion. The novel aspects, on the other hand, are the arrangement and holder 36 of the permanent magnets 35 and their installation between the claw-pole fingers 34 when the claw-pole rotor 15 is assembled. To accomplish this, as shown in FIG. 2, the axial longitudinal slits 38 for accommodating the axial sections 43 of the retaining ring 42 are created first of all in the lateral flanks 37 of the claw-pole fingers 34 of the two claw poles 27 and 28. Furthermore, to hold the permanent magnets 35, the retaining ring 42 composed of non-magnetic material is die-cut out as shown in FIG. 3 with the axial sections 43 and the connection sections 44 out of a piece of sheet metal and then bent and stamped in the shape shown in FIG. 3. The retaining ring 42 is then pushed, first of all, in the axial direction onto the claw-pole fingers 34 of the first claw pole 27 by pushing one longitudinal side each of its axial sections 43 as shown in FIG. 4 into the longitudinal slits 38 in the claw-pole fingers 34 until the rear connection sections 44 rest against the pole tips 40 of the claw-pole fingers 34.

As shown in FIG. 5, the first claw pole 27 with the retaining ring 42 is now mounted on a tool holder 50, whereby a magnetic ring 51 is mounted on the tool holder 50, said magnetic ring enclosing the claw pole 27 with its claw-pole fingers 34 and the retaining ring 42 from the outside, thereby surrounding said parts. The magnetic ring 51 is partially magnetized in the region of the axial sections 43 of the retaining ring 42. The only difference between the tool holder 50 and the prior art is the addition of the magnetic ring 51.

Novel features, on the other hand, are the devices shown in FIGS. 5 and 6 for inserting and positioning the permanent magnets 35 in the retaining ring 42. To accomplish this, round magazines 52 are first loaded with the permanent magnets 35 at another location by placing said permanent magnets in appropriately-sized axial holes 53 of the round magazine 52. The round magazines loaded in this fashion can be delivered on pallets. To produce the claw-pole rotor 15, then, one round magazine 52 each is taken from a not-shown pallet of this nature and positioned over the tool holder 50 as shown in FIG. 5. The axial holes 53 with the permanent magnets 35 are held in their axial position in an annular configuration using vacuum by means of a valve housing 54 located above it and to be moved axially, using the known pick-and-place technique. The round magazine 52 is positioned on the valve housing 54 by means of pins 55 in the valve housing 54 that engage in axial holes 56 in the round magazine 52. An annular plunger 57 is located above the valve housing 54, which said annular plunger is axially displaceable as well and comprises axially projecting fingers 58 on its underside which are also arranged in the shape of a ring and that are matched with the axial holes 53 in the round magazine 52. The round magazine 52, valve housing 54 and plunger 57 are now moved toward the tool holder 50 and positioned on the exposed, end-face connection sections 44 in such a manner that the axial holes 53 with the permanent magnets 35 come to rest in pairs between the connection sections 44. The set of permanent magnets 35 located in the round magazine 52 is then pushed axially by the fingers 58 of the annular punch 57 out of the holes 53 into the space between the claw-pole fingers 34 until the permanent magnets 35 rest against each of the lateral flanks 37 of a claw-pole finger 34. When the permanent magnets 35 are pushed further by the fingers 58 of the plunger 57, the permanent magnets finally glide along each of the lateral flanks 37 of a claw-pole finger 34 and assume an inclined position. Due to the partial magnetization of the magnetic ring 51, the permanent magnets 35 are held in this position at first, so that the round magazine 52 with the valve housing 54 and the plunger 57 can be removed.

FIG. 6 shows the tool holder 50 with the magnetic ring 51 and the set of permanent magnets 35 in the aforementioned inclined position. It is obvious in this figure as well that the permanent magnets 35 are designed in the shape of bars and have a trapezoidal cross-section that increases in size as it extends outward. In order to bring the permanent magnets 35 into their final position underneath the axial sections 43 of the retaining ring 42, a shaped plunger 59—as shown in FIG. 6—is now brought into position over the tool holder 50 with the magnetic ring 51. Said shaped plunger plunges axially with a claw-shaped contour 60 into the magnetic ring 51, and each of its claw tips 61 is guided between the paired, inclined permanent magnets 35. Finally, the permanent magnets 35 are set in their final position, where they are held when the shaped plunger 59 is then removed from the magnetic ring 51.

FIG. 7 shows the tool holder 50 with the magnetic ring 51 and with the permanent magnets 35 located in their final position, each one on the inside of an axial section 43 of the retaining ring 42. The first claw pole 27, together with the retaining ring 42 and the permanent magnets 35, forms a first subassembly.

In another production step, the rotor shaft 20 is preassembled in known fashion with the pole core 17 and the excitation winding 16 to form a second subassembly. As shown in FIG. 8, the first preassembled subassembly on the tool holder 50, together with the magnetic ring 51, is now joined with the aforementioned second subassembly. The first claw pole 27 is placed on a knurled section of the rotor shaft 20 and fixed in position. FIG. 8 also shows that the excitation winding is enclosed by a paper insulation 62 that is fixed in position by a binding 63, and on the top front side of which the wire ends 64 of the excitation winding are guided out for connection to the collector ring arrangement 47. To produce the claw-pole rotor 15, the second claw pole 28 is now placed axially on the exposed end of the rotor shaft in a further working step. The claw-pole fingers 34 of said claw-pole rotor engage between the claw-pole fingers 34 of the first claw pole 27 in the gaps between the axial sections 43 of the retaining ring 42. The longitudinal sides of the axial sections 43 of the retaining ring 42 that are still free are then pushed into the longitudinal slits 38 in the claw-pole fingers 34 of the second claw pole 28. The second claw pole 28 is positioned by means of its sliding fit in the circumferential direction on the rotor shaft 20 by means of the first claw pole 27 and the retaining ring 42. After it is positioned on the rotor shaft 20, it is finally fixed in position by means of caulking. In a further working step, the collector ring arrangement 47 can now be placed on the top end of the rotor shaft 20, as usual.

FIG. 9 shows the fully-assembled claw-pole rotor 15 with the retaining ring 42 configured according to the invention, each of the axial sections 43 of which is located between two adjacent claw-pole fingers 34, and that rest in a longitudinal slit of a lateral flank 37 of the claw-pole fingers 34 by means of their longitudinal sides. The permanent magnets are enclosed and held from the outside by the lateral flanks 37 of the claw-pole fingers 34 and by the connection sections 44 on the side, and by the axial sections 43 of the retaining ring 42. They are further fixed in position between the claw-pole fingers 34 by means of a common dipping impregnation procedure. Additionally, before the rotor is assembled with the stator, they are magnetized with alternating polarity in the circumferential direction of the rotor by magnetic fields applied to the claw-pole fingers 34 from the outside.

What is claimed is:

1. An electric machine, in particular an alternator for motor vehicles, comprising a stator (14) carrying a stator winding and a claw-pole rotor (15) that co-operates with said stator, comprising a pole core (17) surrounded by an excitation winding (16) and two claw-poles (27, 28) mounted on a rotor shaft (20), which said claw-poles are uniformly distributed around the periphery and have claw-pole fingers (34) that intermesh axially in alternate directions at a distance from one another, whereby at least one permanent magnet (35) is arranged between the adjacent claw-pole fingers (34) and is held by a non-magnetic holder (36) and supported against centrifugal forces, and whereby the holder (36) of the permanent magnets (35) is composed of a retaining ring (42) with a zigzag configuration, each of the axial sections (43) of which said retaining ring is located between two adjacent claw-pole fingers (34) and rest by means of their longitudinal sides on each lateral flank (37)

of the claw-pole fingers (34), and each of the connection sections (44) of which said retaining ring connect two adjacent axial sections (43) with each other on the pole tip (40) of the claw-pole finger (34), wherein the retaining ring (42) engages in a longitudinal slit (38) on the lateral flanks (37) of the claw-pole fingers (34) by means the longitudinal sides of its axial sections (43).

2. The electric machine according to claim 1,
wherein the longitudinal slits (38) on the lateral flanks (37) are interconnected with each other via an end-face slit (41) on the pole tip (40) of the claw-pole finger (34), into which said slits a bead (47) integrally molded on the connection section (44) of the retaining ring (42) engages.

3. The electric machine according to claim 1,
wherein each of the axial sections (43) is equipped with a radially outwardly directed longitudinal hollow (45) for increasing its bending stiffness.

4. The electric machine according to claim 1,
wherein the retaining ring (42) is punched, bent and stamped out of a piece of sheet metal.

5. The electrical machine according to claim 4,
wherein the retaining ring (42) is bent and stamped out of a punched-out sheet metal strip to form an open ring.

6. A method for producing an electrical machine, in particular a three-phase generator for motor vehicles according to the preamble of claim 1, wherein a longitudinal slit (38) is recessed into each of the lateral flanks (37) of the claw-pole fingers (34), and wherein the retaining ring (42) with a zigzag configuration is pushed onto the claw-pole fingers (34) of the first claw-pole (27) in the axial direction in such a manner that the axial sections (43) are pushed into the longitudinal slit (38) by means of their one longitudinal side, so that the permanent magnets (35) are then inserted in the axial sections (43) of the retaining ring (42), so that a first subassembly is produced, onto which one end of the rotor shaft (20) is placed, and, finally, the second claw-pole (28) with its claw-pole fingers (34) is inserted between the claw-pole fingers (34) of the first claw-pole (27) in such a manner that the retaining ring (42) is thereby pushed onto the claw-pole fingers (34) of the second claw-pole (28) in the axial direction as well by the fact that the axial sections (43) of the retaining ring (42) are inserted by means of their other longitudinal side into the longitudinal slit (38) of the claw-pole finger (34) of the second claw-pole (28).

7. The production method according to claim 6,
wherein the rotor shaft (20) with the pole core (17) and the excitation winding (16) are preassembled to form a second subassembly.

8. The production method according to claim 7,
wherein the second claw-pole (28) is placed on the other end of the rotor shaft (20).

9. The production method according to claim 6,
wherein the first claw-pole (27) is mounted on a tool holder (50) that has a magnetic ring (42) enclosing the claw-pole fingers (34) and the retaining ring (42) from the outside, which said magnetic ring is partially magnetized in the region of the axial sections (43) of the retaining ring (42).

10. The production method according to claim 9,
wherein the permanent magnets (35) are inserted first of all in an annular arrangement in axial holes (53) of a round magazine, and wherein the round magazine (52) is then positioned over the exposed, end-face connection section (43) of the retaining ring (42) in such a manner that the axial holes (53) with the permanent magnets (35) come to rest in pairs between the connection sections (44) of the retaining ring (42).

11. The production method according to claim 10,
wherein a round plunger (57) having fingers (58) matched with the holes (53) in the round magazine (52) is located above the round magazine (52), and said fingers push the permanent magnets (35) axially out of the holes (53) into the space between the claw-pole fingers (34) until the permanent magnets (35) rest against each of the lateral flanks (37) of a claw-pole finger (34) and then glide along the side of said claw-pole finger, thereby assuming an inclined position, where they are held by the magnetic ring (51).

12. The production method according to claim 11,
wherein, after the plunger (57) and the round magazine (52) are removed, the permanent magnets (35) are set in their final position on the axial sections (43) of the retaining ring (42) by means of a shaped plunger (59) having a claw pole-shaped contour (60) plunging axially into the magnetic ring (51) of the tool holder (50), and said permanent magnets are held in said final position by the magnetic ring (51).

13. The production method according to claim 12,
wherein the first subassembly which is preassembled in this fashion is joined, together with the magnetic ring (51), with the second subassembly and the second claw-pole (28), and the first claw-pole (27) is placed on the rotor shaft (20) of the second subassembly with an interference fit.

14. The production method according to claim 13,
wherein the second claw-pole (28) is pieced on the rotor shaft (20) with a sliding fit, then positioned by the first claw-pole (27) and the retaining ring (42), and, finally, secured on the rotor shaft (20), preferably by caulking it with said rotor shaft.

* * * * *